(12) United States Patent
Harrison et al.

(10) Patent No.: US 11,595,708 B2
(45) Date of Patent: Feb. 28, 2023

(54) METHOD FOR DETERMINING A PLAY DURATION ESTIMATE OF AN ADAPTIVE BIT RATE MEDIA PRESENTATION

(71) Applicant: Openwave Mobility Inc., Redwood City, CA (US)

(72) Inventors: Declan Harrison, Belfast (GB); Christopher Brown, Banbridge (GB)

(73) Assignee: Openwave Mobility Inc., Redwood City, CA (US)

( * ) Notice: Subject to any disclaimer, the term of this patent is extended or adjusted under 35 U.S.C. 154(b) by 0 days.

(21) Appl. No.: 17/584,203

(22) Filed: Jan. 25, 2022

(65) Prior Publication Data
US 2022/0239960 A1 Jul. 28, 2022

(30) Foreign Application Priority Data
Jan. 28, 2021 (GB) ..................... 2101206

(51) Int. Cl.
*H04N 21/24* (2011.01)
*H04N 21/262* (2011.01)
*H04N 21/2662* (2011.01)

(52) U.S. Cl.
CPC ..... *H04N 21/2402* (2013.01); *H04N 21/2662* (2013.01); *H04N 21/26258* (2013.01)

(58) Field of Classification Search
CPC ......... H04N 21/2402; H04N 21/26258; H04N 21/2662
See application file for complete search history.

(56) References Cited

U.S. PATENT DOCUMENTS 11,425,178 B1 * 8/2022 Shen .................. H04N 21/8456
2014/0137168 A1 * 5/2014 Takahashi .......... H04N 21/6125
725/90

(Continued)

FOREIGN PATENT DOCUMENTS

CN 101431647 B * 7/2013 ........... H04H 20/106
CN 108271085 A * 7/2018

(Continued)

OTHER PUBLICATIONS

Anonymous: "What is the optimal algorithm for estimating number of lines of text in a file?", Software Engineering Stack Exchange, Jul. 10, 2013 (Jul. 10, 2013), XP055841082, [retrieved on Sep. 14, 2021].

(Continued)

*Primary Examiner* — Oanh Duong
(74) *Attorney, Agent, or Firm* — EIP US LLP

(57) ABSTRACT

There is described a method for determining a play duration estimate of an adaptive bit rate (ABR) media presentation. The method comprises receiving at a network entity a media playlist manifest file of the media presentation, wherein the manifest file is transmitted from a content server to a client and comprises a plurality of entries, each entry linking to a respective different one of a plurality of media segments of the media presentation. The method further comprises determining a data size of the manifest file; and determining a play duration estimate of the media presentation based on the determined data size of the manifest file, a first value that represents a data size of each of the plurality of entries in the manifest file and a second value that represents a play duration of each media segment of the plurality of media segments of the media presentation.

15 Claims, 10 Drawing Sheets

(56) References Cited

U.S. PATENT DOCUMENTS

| | | | |
|---|---|---|---|
| 2014/0282760 A1* | 9/2014 | Prasad Panje | H04N 21/6125 |
| | | | 725/90 |
| 2015/0163273 A1 | 6/2015 | Radcliffe et al. | |
| 2016/0232538 A1* | 8/2016 | Papakostas | G06F 16/285 |

FOREIGN PATENT DOCUMENTS

| | | | | |
|---|---|---|---|---|
| CN | 112073817 B | * | 6/2019 | |
| CN | 109474854 B | * | 9/2021 | ........... H04N 21/438 |
| CN | 110225407 B | * | 9/2021 | ....... H04N 21/44008 |
| CN | 108600368 B | * | 10/2021 | .............. H04L 67/06 |
| CN | 114780501 A | * | 7/2022 | ........... G06F 16/215 |
| EP | 3270563 A1 | | 1/2018 | |
| WO | WO-2014011421 A1 | * | 1/2014 | ........ H04W 28/0205 |
| WO | WO-2017107670 A1 | * | 6/2017 | ........... H04N 17/004 |

OTHER PUBLICATIONS

Combined Search and Examination Report dated Oct. 1, 2021 for GB Application No. GB2101206.7.

* cited by examiner

| | X Value | Y Value | Z Value |
|---|---|---|---|
| Server Type 1 | x value server Type 1 | y value server Type 1 | z value server Type 1 |
| Server Type 2 | x value server Type 2 | y value server Type 2 | z value server Type 2 |
| Server Type 3 | x value server Type 3 | y value server Type 3 | z value server Type 3 |
| Server Type 4 | x value server Type 4 | y value server Type 4 | z value server Type 4 |

| | Device Type 1 | Device Type 2 |
|---|---|---|
| Server Type 1 | x value, y value, z value for server Type 1 & device type 1 | x value, y value, z value for server Type 1 & device type 2 |
| Server Type 2 | x value, y value, z value for server Type 2 & device type 1 | x value, y value, z value for server Type 2 & device type 2 |
| Server Type 3 | x value, y value, z value for server Type 3 & device type 1 | x value, y value, z value for server Type 3 & device type 2 |
| Server Type 4 | x value, y value, z value for server Type 4 & device type 1 | x value, y value, z value for server Type 4 & device type 2 |

Figure 6c

METHOD FOR DETERMINING A PLAY DURATION ESTIMATE OF AN ADAPTIVE BIT RATE MEDIA PRESENTATION

CROSS-REFERENCE TO RELATED APPLICATIONS

This application claims the benefit under 35 U.S.C. § 119(a) and 37 CFR § 1.55 to UK Patent Application No. 2101206.7, filed on Jan. 28, 2021, the entire content of which is incorporated herein by reference.

BACKGROUND

Field of the Invention

The present invention relates to a method for determining a play duration estimate of an adaptive bit rate (ABR) media presentation.

Description of the Related Technology

Adaptive Bit Rate (ABR) streaming, for example, Hyper Text Transfer Protocol (HTTP) Adaptive Video Streaming (AVS), is a known technique used to stream media presentations, for example, video and/or audio presentations over the Internet and other communications networks. In order to support ABR streaming, typically, a content server, for example a video server, in a communications network, makes available for download multiple variants of the same media content, each variant having one or more characteristics associated therewith that are different to those of the other versions. For example, the one or more characteristics relate to media quality, as indicated, for example, by the bit rate or resolution of the media presentation.

Each variant is sub divided into a plurality of consecutive smaller multi-second parts often referred to as segments or chunks. Each segment is typically between 2 to 10 seconds of duration. The content server also makes available a so called manifest file which contains information (e.g. metadata) describing each and every available segment which is to be used by a client device in order to play back segments. A manifest file also contains a different pointer to or an address (typically a Uniform Resource Locator (URL)) for each segment of each variant of the media presentation, or alternatively, a different pointer to an address (again typically a URL) for each version of the media presentation and a byte range for each different segment within each version. This segment pointer information enables a client device to individually request segments from the content server.

Prior to downloading a desired ABR media presentation from an ABR content server, a client (for example an App running on a client device e.g. a mobile device) first downloads the manifest file for that media presentation and uses the manifest file to identify the different available versions of the media presentation. Based on the information in the manifest file, the client sends sequential HTTP requests for segments of the media presentation, the segments being of the variant that has a quality level most appropriate for the bandwidth currently available to the ABR on the connection over which the media presentation is being downloaded.

Typically, in ABR streaming, a HTTP GET request will only be issued by a client device for the next segment in the sequence when the complete previously requested segment has been received in a HTTP RESPONSE corresponding to the previous HTTP GET request.

The client continuously monitors the available download bandwidth and if it finds that the bandwidth has deteriorated to an extent that it is now too low for the variant of the segments currently being downloaded, the client starts to request the next segments for displaying the media presentation from a lower quality variant (if available). Conversely, if it finds that the bandwidth has improved to an extent that it can accommodate a higher quality variant than that of the segments currently being downloaded, the client starts to request the next segments for displaying the media presentation from a higher quality variant (if available).

Accordingly, ABR streaming enables a client to dynamically select the best available stream according to network throughput. Requesting segments one after the other at possibly different resolutions can result in a smoother media experience for a user even if the available bandwidth varies.

Current proprietary implementations of ABR streaming include Microsoft's 'Smooth Streaming' implemented by its Silverlight player, Apple's 'HTTP Adaptive BitRate Streaming' implemented in its desktop and mobile products, and Adobe's 'HTTP Dynamic Streaming' implemented by its Flash player (v10.1 and later). All three of these implementations support H.264 as a video codec and Advanced Audio Coding (AAC) as an audio codec.

In addition, the standards body 3GPP has defined its standard 'Dynamic Adaptive Streaming over HTTP' and the standards body MPEG its standard 'Dynamic Adaptive HTTP Streaming'.

An intermediate network element, for example a proxy server in a cellular communications network or an Internet service provider network, located in the data path between a client and an ABR content server can be configured to exercise control over the client by artificially changing the bandwidth available for the connection between the client and the ABR content server. For example, if the intermediate network element reduces the bandwidth available for the data being download from a ABR content server to the client, if possible, the client will react by requesting lower quality segments. An intermediate network element may act in this way in order to prevent a client consuming too much network resources.

It is desirable to provide a technique by which an intermediate network entity can estimate the play duration of an ABR presentation (i.e. how long the complete ABR presentation lasts when played at normal speed at a client), when that ABR presentation is being transmitted from an ABR media server to an ABR client over a secure connection via the intermediate network entity and prior to any of the actual media segments of the ABR presentation being delivered to the ABR client.

SUMMARY

According to a first aspect of the invention, there is provided a method for determining a play duration estimate of an adaptive bit rate (ABR) media presentation, the method comprising: receiving, at a network entity that is located between a client and a server, a media playlist manifest file of an ABR media presentation, wherein the media playlist manifest file is transmitted from the server to the client and comprises a plurality of entries, each entry of the plurality of entries linking to a respective different one of a plurality of media segments of the ABR media presentation; determining a data size of the media playlist manifest file; and determining a play duration estimate of the ABR media presentation based on the determined data size of the media playlist manifest file, a first value that represents a data size of an individual entry of the plurality of entries in the manifest file and a second value that represents a play duration of an individual media segment of the plurality of media segments of the ABR media presentation.

According to a second aspect of the invention there is also provided an apparatus for determining a play duration estimate of an adaptive bit rate (ABR) media presentation, the apparatus comprising: at least one processor; and at least one memory including computer program code; the at least one memory and the computer program code being configured to with the at least one processor cause the apparatus at least to perform the steps of: receiving, at a network entity that is located between a client and a server, a media playlist manifest file of an ABR media presentation, wherein the media playlist manifest file is transmitted from the server to the client and comprises a plurality of entries, each entry of the plurality of entries linking to a respective different one of a plurality of media segments of the ABR media presentation; determining a data size of the media playlist manifest file; and determining a play duration estimate of the ABR media presentation based on the determined data size of the media playlist manifest file, a first value that represents a data size of an individual entry of the plurality of entries in the manifest file and a second value that represents a play duration of an individual media segment of the plurality of media segments of the ABR media presentation.

According to a third aspect of the invention there is also provided a non-transitory computer programme readable storage medium comprising a set of computer readable instructions, which, when executed by a processing system causes the system to implement a method for determining a play duration estimate of an adaptive bit rate (ABR) media presentation, the method comprising: receiving, at a network entity that is located between a client and a server, a media playlist manifest file of an ABR media presentation, wherein the media playlist manifest file is transmitted from the server to the client and comprises a plurality of entries, each entry of the plurality of entries linking to a respective different one of a plurality of media segments of the ABR media presentation; determining a data size of the media playlist manifest file; and determining a play duration estimate of the ABR media presentation based on the determined data size of the media playlist manifest file, a first value that represents a data size of an individual entry of the plurality of entries in the manifest file and a second value that represents a play duration of an individual media segment of the plurality of media segments of the ABR media presentation.

BRIEF DESCRIPTION OF THE DRAWINGS

Methods and systems for will now be described as an embodiment, by way of example only, with reference to the accompanying figures in which:

FIG. 6b illustrates a second look up table storing values that may be used in the method illustrated in FIG. 5;

FIG. 6c illustrates a third look up table storing values that may be used in the method illustrated in FIG. 5;

Several parts and components appear in more than one Figure; for the sake of clarity the same reference numeral will be used to refer to the same part and component in all of the Figures.

DETAILED DESCRIPTION OF ILLUSTRATIVE EMBODIMENTS

Figure 1:
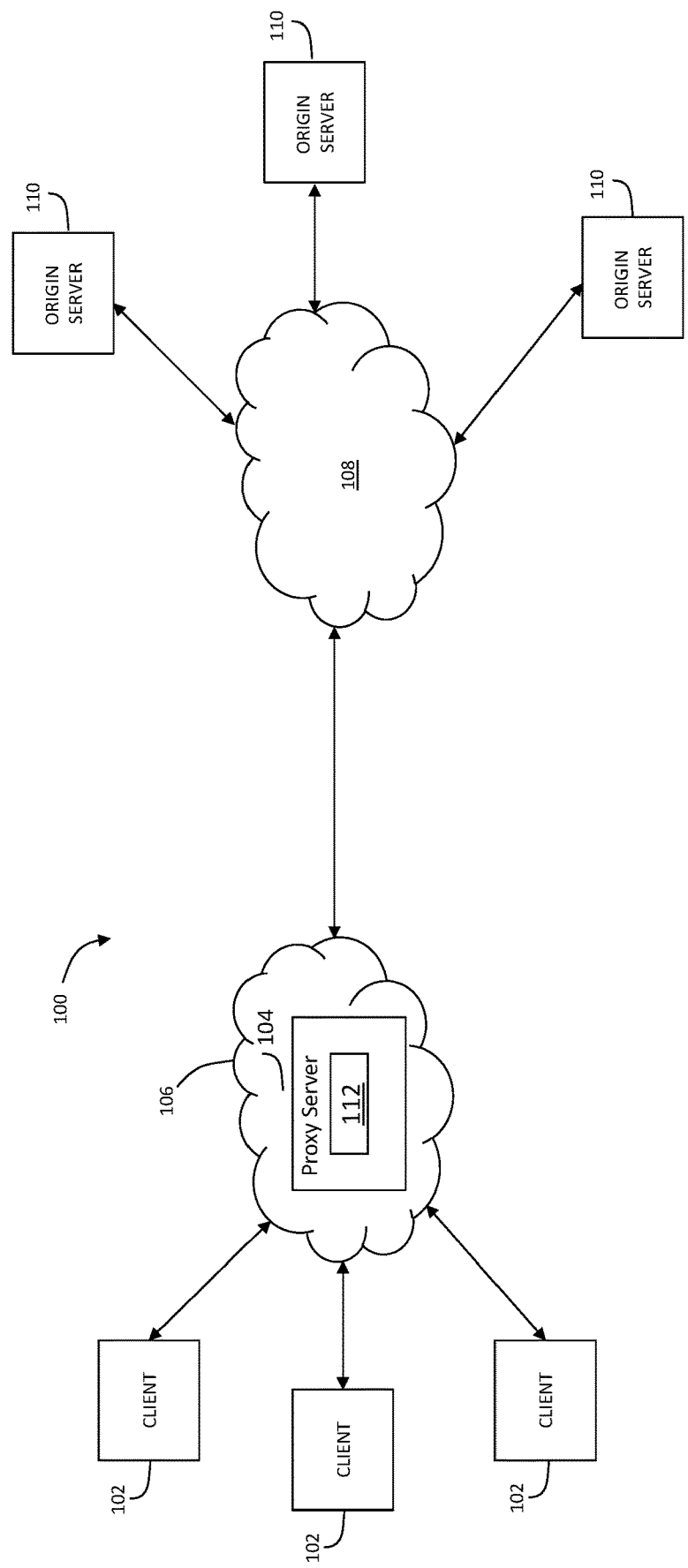
FIG. 1 is a schematic illustration of a presentation delivery system.

FIG. 1 depicts an ABR media presentation delivery system 100 in accordance with an embodiment of the invention. As described in more detail below, the ABR media presentation delivery system 100 includes a plurality of client devices 102, an intermediate network entity 104, an access network 106, a data network 108 and a plurality of origin servers 110.

A client device 102 is any networked device including, without limitation, a mobile phone, a smart phone, a personal digital assistant (PDA), a tablet, a set-top box, a video player, a laptop, or a personal computer (PC). In one embodiment, a client device 102 is a wireless device that can support at least one of various different radio frequency (RF) communications protocols, including without limitation, Global System for Mobile communications (GSM), Universal Mobile Telecommunications System (UMTS), Code Division Multiple Access (CDMA), Worldwide Interoperability for Microwave Access (WiMax) and communications protocols as defined by the $3^{rd}$ Generation Partnership Project (3GPP) or the $3^{rd}$ Generation Partnership Project 2 (3GPP2), 4G Long Term Evolution (LTE), 5G New Radio (NR) and IEEE 802.16 standards bodies.

Although some wireless communications protocols are identified herein, it should be understood that the present disclosure is not limited to the cited wireless communications protocols. In another embodiment, a client device 102 is a wired device that communicates with the intermediate network entity 104 through a communication interface, such as analog modem, ISDN modem or terminal adapter, DSL modem, cable modem, Ethernet/IEEE 802.3 interface, or a combination thereof. In another embodiment, a client device 102 is connected to the intermediate network entity 104 via a combination of wireless and wired communication interfaces.

In this example, the intermediate network entity 104 is a proxy server 104 in the data communications path between the client devices 102 and the origin servers 110. In one embodiment, the proxy is a transparent proxy that passes requests and responses (e.g., HTTP requests and responses) between client devices such as a client device 102 and host servers such as an origin server 110 without modifying the requests and responses. A proxy that simply passes requests and responses is often referred to as a gateway or tunneling proxy. In another embodiment, the proxy is a non-transparent proxy that can modify requests and responses between client devices and content servers in order to provide additional services. For example, a non-transparent proxy may provide media caching services, group annotation services, media type transformation services, or protocol reduction services.

In one embodiment, the proxy server 104 is part of the access network 106, which provides a communications interface for the client devices 102 to access the origin servers 110 via the data network 108 which may be, for example, the Internet or an intranet. Typical access networks include wireless service provider networks (e.g., that offer 3G, 4G, 5G and/or WiFi access) and Internet Service Providers (ISPs, e.g., that offer dial-up, DSL, cable modem access and broadband fibre optic access). A private enterprise network can also serve as the access network if client devices within the private enterprise network can access the Internet through the private enterprise network.

In one embodiment, the access network 106 is a wireless service provider network that provides a wireless communications interface for the client devices 102. The wireless service provider network is accessible on a subscription basis (e.g., prepaid or post-paid) as is known in the field. In an embodiment, the wireless service provider network is a closed domain that is accessible only by a subscriber (e.g. a user of the user device) that is in good standing with the operator of the wireless service provider network. Accordingly, as is well known in the field, amongst other components, the access network 106 may include a radio access network (not shown) and an Internet gateway (not shown). The radio access network includes one or more base stations (not shown) to facilitate communications among wireless devices that are within a communication range of the base stations.

Each base station has at least one RF transceiver and the base stations communicate with the wireless devices using RF communication signals. The radio access network facilitates network communications among multiple wireless devices within the same wireless service provider network and between wireless devices in other wireless service provider networks and provides interfaces to facilitate communications with other entities, such as a Public Switched Telephone Network (PSTN), a Wide Area Network (WAN), the Internet, Internet servers, hosts, etc., which are outside of the wireless service provider network. In an embodiment, the wireless service provider network is operated by a single wireless service provider, such as, for example, AT&T, VERIZON, T-MOBILE, and SPRINT. The Internet gateway (not shown) of the access network provides a gateway for communications between the client device 102 and Internet-connected hosts and/or servers, which can also be referred to as the "cloud." Depending upon the exact nature of the access network 106, the Internet gateway may include a Serving General Packet Radio Service (GPRS) Support Node (SGSN) and a Gateway GPRS Support Node (GGSN) in a 3G network, a Serving Gateway (GW) and a Packet Data Network (PDN) Gateway (GW) in a 4G network or be provided by the Session Management Function (SMF) and User Plane Function (UPF) in a 5G network. In this way, the access network 106 provides access to the Internet for its subscribers.

The origin servers 110 can be any devices or systems that host digital content, which can be stored in various formats, such as video files, audio files, and/or text files. In one embodiment, each origin server 110 is an Internet-connected host or server that hosts Internet accessible content elements. Each origin server 110 may be a web server that can be accessed via, for example, HTTP, Internet Message Access Protocol (IMAP), or File Transfer Protocol (FTP). A content element is any set of digital data suitable for transfer in a networked environment, such as video files, markup language files, scripting language files, music files, image files or any other type of resource that can be located and addressed through, for example, the Internet.

Each origin server 110 makes available media presentations, for example video presentations, by adaptive bit rate (ABR) streaming, for example, HTTP adaptive streaming. Accordingly, each origin server 110 makes available content that is divided into a plurality of segments or portions with each segment or portion being available at different resolutions or quality levels.

The proxy server 104 comprises a monitoring component 112 that monitors communication connections as they are set up between client devices 102 and origin servers 110 and then monitors the data flows of ABR streaming sessions conducted over those communication connections. Each data flow comprises a series of Application Layer (known as Layer 7 in the Open Systems Interconnection (OSI) model) protocol (e.g. HTTP or HTTPs) requests sent from a client device 102 to an origin server 110 and a corresponding series of Layer 7 responses sent back from the origin server 110 to the client device 102. Each request requests a part (e.g. a manifest file or a segment) of an ABR media presentation stored at an origin server 100 to be delivered to the requesting client device 102 and each corresponding response delivers the requested part of the ABR presentation to the requesting client device 102.

As will be explained in more detail below, the monitoring component 112 receives a manifest file transmitted from an origin server 110 to a client device 102 during an ABR streaming session and determines the data size of that manifest file. The monitoring component 112 then uses the determined data size of the manifest file to determine an estimate of the play duration of the ABR media presentation associated with the manifest file. The monitoring component 112 is able to determine the data size of the manifest file without parsing the manifest file and is able to determine the play duration estimate of ABR media presentation prior to any Layer 7 responses that are carrying segments of the ABR media presentation passing through the proxy server 104 en-route to the client 102 from the origin server 110.

Having determined the play duration estimate of the ABR media presentation, the monitoring component 112 is able to use the determined play duration estimate as an input parameter to an algorithm for determining a control policy for applying to the ABR streaming session.

Figure 2:
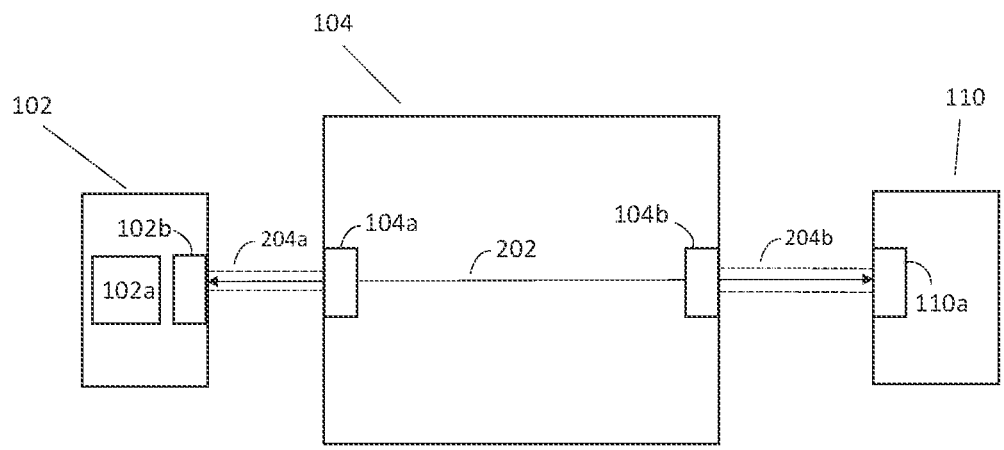
FIG. 2 is a schematic illustration of a download session involving a client application, a proxy server and an origin server.

FIG. 2 shows an example of a data download session 202 involving a client device 102, the proxy server 104 and an origin server 110. The data download session 202 is associated with an ABR client application 102a, for example, a video player running on the client device 102, which accesses and downloads a media presentation, in this example a video file, stored at the origin server 110 using an ABR streaming protocol.

In this example, the data download session is carried over a split TCP connection 204a, 204b between the client device 102 and the origin server 110. The split TCP connection comprises a first TCP connection 204a between the client device 102 and the proxy server 104 and a second TCP connection 204b between the proxy server 104 and the origin server 110. The first TCP connection 204a is defined by a client-side TCP socket 102b, at the client device 102, opened by the client application 102a and a client-side socket 104a, at the proxy server 104, opened by the proxy server 104. The second TCP connection 204b is defined by a server-side TCP socket 104b, at the proxy server 104, opened by the proxy server 104 and a server socket 110a, at the origin server 110, opened by the origin server 110. The split TCP connection 204a, 204b as a whole is defined by the combination of the client socket 102b at the client device 102 and the server socket 110a at the content server 110.

The session 202 typically comprises a plurality of HTTPs requests sent from the client application 102a to the origin server 110 and a plurality of corresponding HTTPs responses sent in reply from the origin server 110 to the client application 102a. Each HTTPs request is for a particular segment at a particular quality level (i.e. variant) of the video file being downloaded and each corresponding HTTPs response contains the requested segment. Each HTTPs request sent from the client application 102a for the next segment in the sequence of segments that make up the video file is only sent when the HTTPs response containing the previous requested segment has been received at the client application 102a.

As is standard in TCP/IP networks, each HTTPs request and each HTTPs response is transported over the split TCP connection 204a, 204b in one or more TCP segments (with each TCP segment itself being transported in one or more IP packets). The proxy server 104 acts as a TCP proxy server which in respect of HTTPs requests being sent from the client application 102a to the origin server 110 reads TCP payload data received at its client side socket 104a and writes that TCP payload data to its server side socket 104b for onwards transmission to the origin server 110 and in respect of HTTPs responses being sent from the origin server 110 to the client application 102a reads TCP payload data received at its server side socket 104b and writes that TCP payload data to its client side socket 104a for onwards transmission to the client application 102a. In this example however, the proxy server 104 does not reassemble any of the HTTPs requests or HTTPs responses from the TCP payload data that makes up those HTTPs requests or HTTPs responses.

The split TCP connection 204a, 204b is a secure connection with the client device 102 and the origin server 110 using a suitable cryptographic protocol, for example the Transport Layer Security (TLS) protocol or the Secure Sockets Protocol (SSL) to encrypt the data that is conveyed between the two in the payloads of TCP segments.

Figure 3:
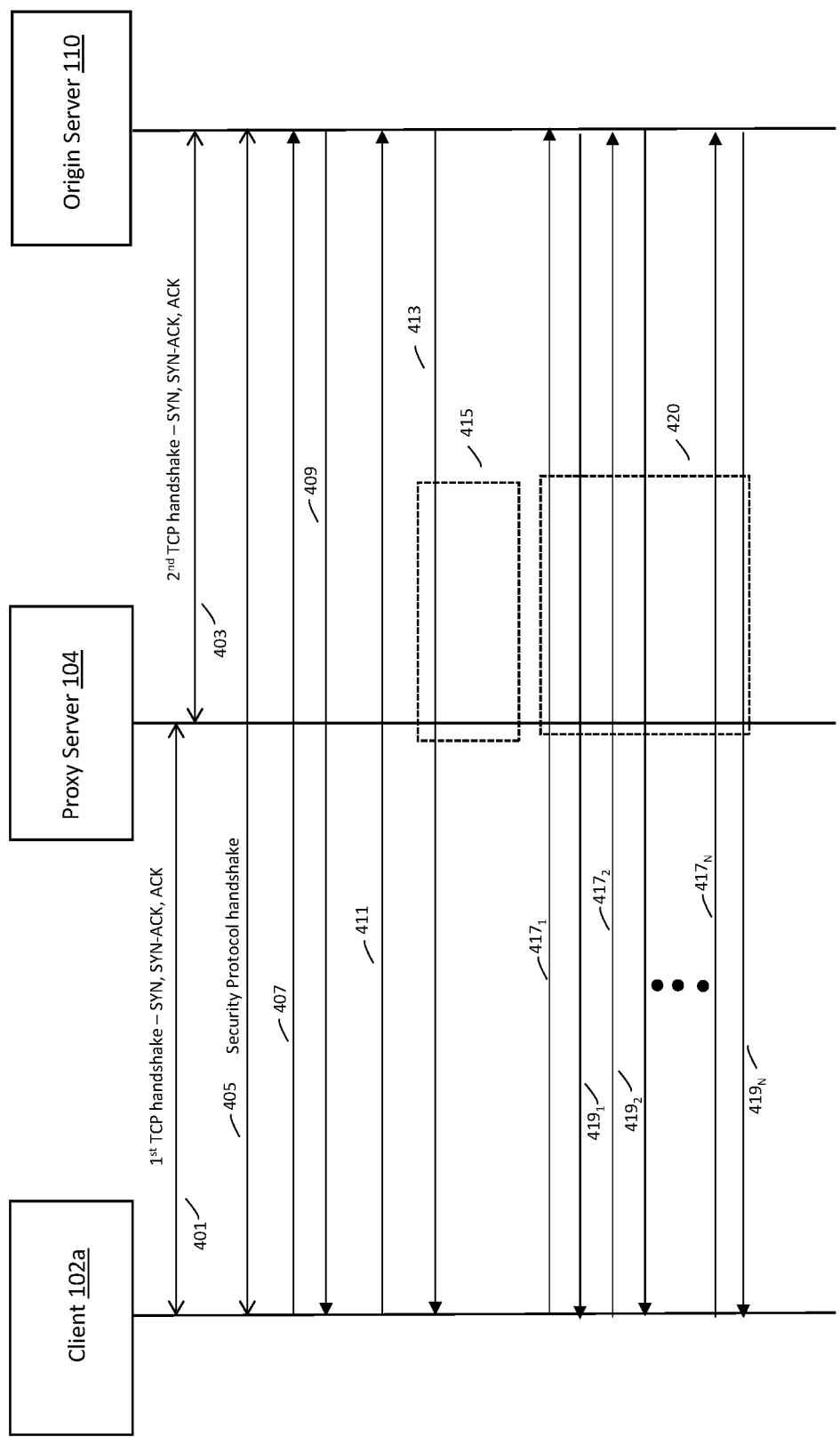
FIG. 3 is a schematic illustration of an exchange of messages in an example embodiment of the invention.

FIG. 3 illustrates an exchange of messages between the client application 102a, proxy server 104 and origin server 110 in an example embodiment of the invention.

The first TCP connection 204a between the client 102a and the proxy server 104 is established using a first TCP 3-way handshake 401. The first TCP handshake 401 comprises a SYN packet sent from the client 102a to the origin server 110 but which is intercepted by the proxy server 104, a SYN-ACK sent from the proxy server 104 to the client 102a in response to the SYN, and an ACK sent from the client 102a in response to the SYN-ACK and which is also intercepted by the proxy server 104.

The second TCP connection 204b between the proxy server 104 and the origin server 110 is established using a second TCP 3-way handshake 403. The second TCP handshake 403 comprises a SYN packet sent from the proxy server 104 to the origin server 110, a SYN-ACK sent from the proxy server 104 to the origin server 110 in response to the SYN, and an ACK sent from the origin server 110 in response to the SYN-ACK.

Next, the client 102a and the origin server 110 exchange messages 405 in accordance with a handshake of a suitable security protocol, for example, SSL or TLS in order to secure the connection between the two. These messages 405 pass through the proxy server 104 which may read the messages. The messages 405 exchanged in this handshake enable the client 102a and the origin server 110 to agree on a version of the protocol to use, select cryptographic algorithms, and establish a shared secret key for encrypting/decrypting the payloads of subsequent TCP segments that will later be exchanged between the two. The handshake messages 405 may also provide the client 102a with the origin server's 110 digital certificate which the client 102a can validate in order to authenticate the origin server 110.

In this example, during the exchange of messages 405, the proxy server 104 inspects one or more of the messages 405 and identifies the origin server 110 as being an ABR presentation origin server (i.e. an origin server that provides ABR presentations to requesting clients). The proxy server 104 may, for example, inspect the Server Name Indication field in a client hello message included in the messages 405 and on that basis identify origin server 110 as being a particular type of ABR origin server, for example, a Netflix® server. The proxy server 104 may, for example, inspect a certificate included in a server hello message included in the messages 405 and on that basis of an identity indicated in the certificate identify the origin server 110 as being a particular type of ABR origin server, for example, a Netflix® server. Other techniques exist by means of which the proxy server 104 can identify the origin server 110 as being a particular type of ABR origin server. For example, the proxy server 104 may read the origin server's 110 IP address from the SYN packet in the $1^{st}$ TCP handshake 401 and perform a reverse Domain Name Server (DNS) look up to obtain a Uniform Resource Locator (URL) that identifies origin server 110. In this example, the proxy server 104 identifies the origin server 110 as being an ABR origin server 110 and configures the monitoring component 112 to monitor for an ABR dataflow between the client application 102a and the origin server 110. The proxy server 104 identifies the dataflow between the client application 102a and the origin server 110 by means of the TCP 4-Tuple (client IP address, client port, server IP address, server port) that is inspectable in the IP/TCP packets of the dataflow.

Once the secure connection is established, the client application 102a and the origin server 110 exchange a series of HTTPs requests and corresponding HTTPs responses to download a media presentation using ABR streaming from the origin server 110 to the client application 102a. All of these HTTPs requests and corresponding HTTPs responses pass through the proxy server 104 and are monitored by the monitoring component 112.

The first HTTPs request 407 sent from the client application 102a to the origin server 110 causes the origin server 110 to send back to the client application 102a a first HTTPs response 409 containing a master manifest file for the requested media presentation. The master manifest file is a file that lists the different variants available for the media presentation the origin server 110, the bitrate associated with each variant and, for each variant, a link to a media variant playlist manifest file for that variant.

Based on the information in the master manifest file, the client application 102a sends a second HTTPs request 411 to the origin server 110. The second HTTPs request is a request for one of the variant playlist manifest files listed in the master manifest file. Typically, the client application 102a will request a variant playlist manifest file of a variant that has a quality (e.g. as indicated by bitrate or resolution), as listed in the master manifest file, that the client application 102a determines is appropriate for the current bandwidth available to the client application 102a. In response to the second HTTPs request 411, the origin server 110 transmits a second HTTPs response 413 containing the variant playlist manifest file requested by the client application 102a.

The monitoring component 112 monitors the data being exchanged between the client application 102a and the origin server 110 and as will be explained in more detail below, at 415, determines a play duration estimate of the adaptive bit rate media presentation that is associated with the variant playlist manifest file that is contained within the second HTTPs response 413.

The client application 102a receives the second HTTPs response 413 and based on the information in the variant playlist manifest file, the client application 102a sends a sequence of HTTPs requests $417_1$ to $417_N$ to the origin server 110, each HTTPs request being for a respective variant of a respective one of the segments of video that together make up the video content to be downloaded. The origin server 110 responds to each HTTPs request $417_1$ to $417_N$ by sending a HTTPs response $419_1$ to $419_N$ containing the variant of the segment that has been requested. It will be appreciated that, in some examples, in practice, each HTTPs request sent by the client application 102a will only be sent after the HTTPs response from the origin server 110 to the previous HTTPs request from the client application 102a has been received by the client application 102a.

The monitoring component 112 continues to monitor 420 the ABR data flow being exchanged between the client application 102a and the origin server 110 and, as will be explained in more detail below, based on the estimated play duration, may apply one or more control policies to the ABR data flow.

Figure 4:
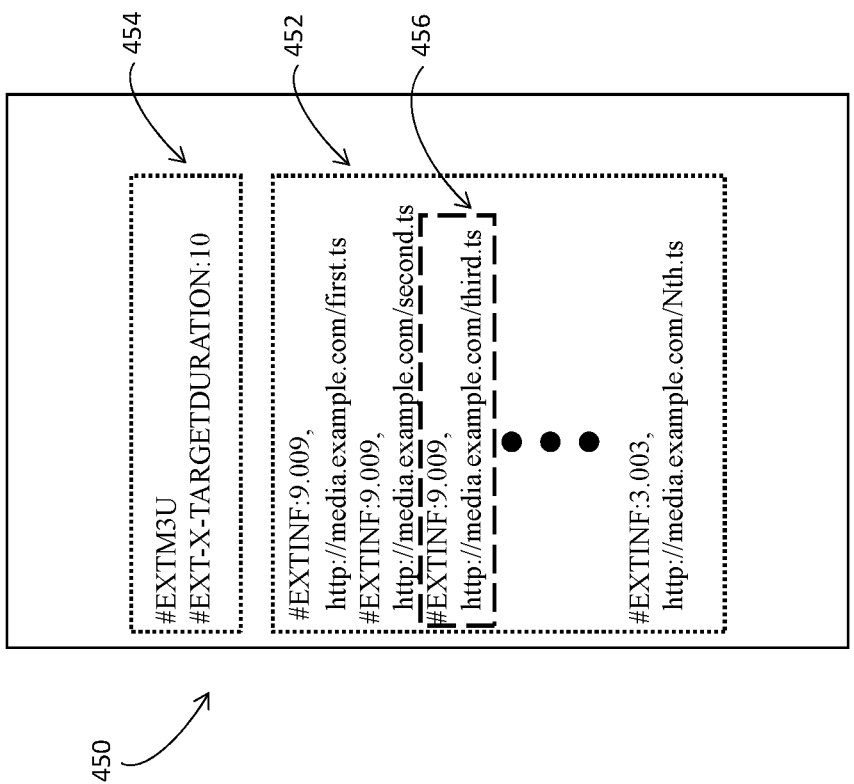
FIG. 4 is a schematic illustration of a manifest file.
Figure 5:
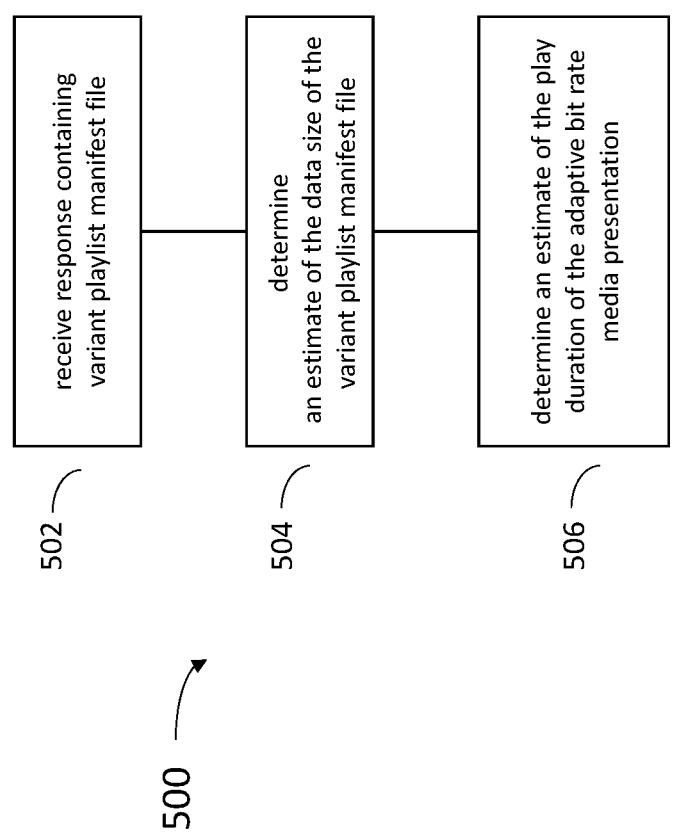
FIG. 5 is a schematic illustration of a flow diagram illustrating a method of determining an estimate of a play duration of an ABR media presentation.

Referring now to FIGS. 4 and 5, there will be described an example of a process by which the monitoring component 112 estimates the play duration of the ABR presentation at 415 in FIG. 3.

FIG. 4 schematically illustrates an example of a variant playlist manifest file 450 that is contained in the second HTTPs response 413. The variant playlist manifest file 450 comprises a first section 452 (indicated by a first dotted box) and a second section 454 (indicated by a second smaller dotted box).

The first section 452 is a list comprising a plurality of entries, each entry of the plurality of entries referencing a respective different one of a plurality of media segments of the ABR media presentation. In this example, the first section 452 comprises a first entry to an Nth entry (where N is an integer) of which, for clarity, only the $3^{rd}$ entry 456 is labelled. In combination, the N entries reference all of the N media segments of the bitrate variant associated with the variant playlist manifest file 450 that make up the requested media presentation.

Each entry of the plurality of entries 452 comprises one or more media segment tags followed by a link to the media segment. In this example, each entry of the plurality of entries 452 comprises a first line 456a (i.e. #EXTINF: 9.009,) which is the EXTINF tag that specifies the duration of the relevant media segment in seconds and a second line 456b (i.e. http://media.example.com/third.ts) which is the link, for example a URL, by means of which the client application 102a can request the media segment (in the case of the third entry 456 the third media segment in the presentation) represented by that link from the origin server 110. As will be appreciated by those skilled in the art, each entry of the plurality of entries 452 may comprise additional media segment tags, prior to the link 456b, as specified in RFC 8216.

The second section 454 comprises all data in the variant playlist manifest file 450 that is data other than the data of the first section 452 (i.e. data other than the data that is specific to the individual media segments). In this example, the second section 454 comprises a first line that is the format identifier tag #EXTM3U and a second line that is the EXT-X-TARGETDURATION tag which specifies in seconds the maximum duration of any media segments (in this example, the EXT-X-TARGETDURATION indicates that all Media Segments will be 10 seconds long or less). As will be appreciated by those skilled in the art, the second section 454 may comprise further or different data, for example, the EXT-X-VERSION tag, the EXT-X-PLAYLIST-TYPE tag or any of the other relevant tags specified in RFC 8216. In essence, second section 454 can be considered as being the 'header' of the variant playlist manifest file 450 and the first section 452 as being the 'payload' of the variant playlist manifest file 450.

An example process 500 by which the monitoring component 112 may determine the play duration estimate at 415 is now described with reference to FIG. 5.

At step 502, the intermediate network entity 104 receives the second HTTPs response 413 that contains the variant playlist manifest file 450.

At step 504, as the second HTTPs response 413 passes through the intermediate network entity 104 en-route to the client application 102a, the monitoring component 112 determines an estimate of the data size of the variant playlist manifest file 450.

At step 506, the monitoring component 112 determines an estimate of the play duration of the adaptive bit rate media presentation that is associated with the variant playlist manifest file 450 based at least on, the estimated data size of the variant playlist manifest file 450, a first value that represents a data size of an individual entry of the plurality of entries 456 in the variant playlist manifest file 450 and a second value that represents a play duration of an individual media segment of the plurality of media segments of the ABR media presentation.

In one example, the monitoring component 112 determines the estimate of the play duration in accordance with the expression:

$$\text{Play duration} = (((D-X)/Y)*Z) \qquad (1)$$

where:

D is the determined data size of variant playlist manifest file 450;

Y is the first value that represents a data size of an individual entry of the plurality of entries 456 in the variant playlist manifest file 450;

Z is the second value that represents a play duration of an individual media segment of the plurality of media segments of the ABR media presentation; and X is a third value that represents a data size of all the data in the variant playlist manifest file 450 that is data other than data of the first section 452. In this example, this is the data of the second section 454 which, as discussed above, is in effect a header of the variant playlist manifest file 450.

In this example, the first value Y, the second value Z and the third value X are stored in a look up-table that is accessed by the monitoring component 112 in order for the monitoring component 112 to determine the estimate of the play duration.

As an example only, typical values for Y, Z and X are as follows:

Y=100 Bytes
Z=9 seconds
X=75 Bytes

It should be appreciated that the value of the expression:

$$((D-X)/Y)$$

is an estimate of the total number of segments at a given variant quality that make up the ABR media presentation.

Given that Z represents a play duration of each of those segments, it follows that the value of the expression:

$$(((D-X)/Y)*Z)$$

is an estimate of the value for the play duration of the entire ABR media presentation.

As an example, if the estimate of the data size of the variant playlist manifest file 450 determined by the monitoring component 112 at step 504 is 1075 Bytes then the play duration estimate of the entire ABR media presentation determined by the monitoring component 112 at step 504, if using the particular expression (1) and the examples values of Y, Z and X given above, is 90 seconds.

It will be appreciated that in some examples, in particular where the value of D is much larger than the value of X, an acceptable estimate of the play duration can be obtained without including X in expression (1).

In some examples, the first value Y, the second value Z and the third value X are all configurable values that are configured by the monitoring component 112 in preparation for the monitoring component 112 to estimate a play duration.

In the example of the variant playlist manifest file 450 illustrated in FIG. 4, every media segment has a play duration of 9 seconds except the final (Nth) media segment which has a play duration of 3 seconds. This might be the case when the ABR streaming protocol at issue requires that each media segment has the same constant value play duration except the final media segment which may have a smaller play duration in order to complete the presentation. In such cases, as in the example described above, the constant value is an appropriate value for the second value Z and leads to a good estimation of the overall play duration of the media presentation. In other examples and depending on the precise requirements of the ABR streaming protocol at issue, the play durations of the media segments may vary more widely. In some examples, an average value of the play durations of the media segments would be an appropriate value for the second value Z.

Figure 6A:
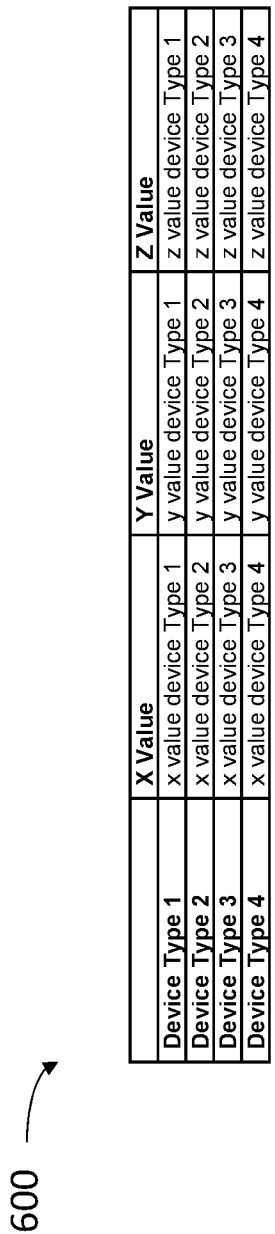
FIG. 6a illustrates a first look up table storing values that may be used in the method illustrated in FIG. 5.

Referring to FIG. 6*a*, in some examples, the intermediate network entity 104 stores a look up table 600 which, for each of a plurality of different client device types, stores a value for X, a value for Y and a value for Z appropriate for that client device type.

The values for each given different client device type are values that are known from prior analyses to be appropriate values for that given client device type. For example, if client device Type 1 represent any mobile device running the iOS operating system, the Y value for that entry in the look up table is a value known to be representative of a data size of each individual entry 456 in a variant playlist manifest file 450 of the Apple HLS adaptive streaming protocol, the Z value for that entry in the look up table is a value known to be representative of the play duration of each media segment of the Apple HLS adaptive streaming protocol and the X value for that entry in the look up table is a value known to be representative of the data size of all the data in the variant playlist manifest file of the Apple HLS adaptive streaming protocol other than the data of the media segments.

The intermediate network entity 104 identifies the client device type of the client device 102 that the client application 102*a* is running on and provides the client device type to the monitoring component 112. The monitoring component 112 matches the identified client device type a client device type in the look up table 600 and selects the Y value, Z value and X value stored in the look up table 600 for that client device type as the first value Y, the second value Z and the third value X to be used to determine the estimate of the play duration in accordance with the expression (1) above.

The intermediate network entity 104 may make use of device classification information to classifies the client device 102 as being a particular type of client device (e.g. an iOS device or Android device). In some examples, the device classification information may be obtained from the access network 106 after the client device 102 has connected to the access network 106. In other examples, the intermediate network entity 104 obtains the device classification information from observing other data flows involving the client device 102. For example, if a data flow involving the client device 102 is a non-secure HTTP flow, it is possible for the intermediate network entity 104 to observer the User-Agent Field in the headers of the HTTP messages sent from the client device 102 and the User-Agent field may be used to classify the client device 102 as being a particular type of client device.

Referring to FIG. 6*b*, in some examples, the intermediate network entity 104 stores a look up table 610 which, for each of a plurality of different ABR origin server types, stores a value for X, a value for Y and a value for Z appropriate for that server type.

The values for each given different server type are values that are known from prior analyses to be appropriate values for that given server type. For example, if server Type 1 represents Netflix® servers, the X, Y and Z values for that entry in the look up table are values known to be appropriate for ABR content provided by Netflix® servers, if server Type 2 represents Dailymotion® servers, the X, Y and Z values for that entry in the look up table are values known to be appropriate for ABR content provided by Dailymotion® servers.

The intermediate network entity 104 identifies the ABR origin server type (as described above) and provides the server type to the monitoring component 112. The monitoring component 112 matches the server type with a server type in the look up table 610 and selects the Y value, Z value and X value stored in the look up table 610 for that client server type as the first value Y, the second value Z and the third value X to be used to determine the estimate of the play duration in accordance with the expression (1) above.

Referring to FIG. 6*c*, in some examples, the intermediate network entity 104 stores a look up table 620 which, for each of a plurality of different combinations of ABR origin server types and device types, stores a value for X, a value for Y and a value for Z appropriate for that server type and device type combination.

The values for each given different server type and device type combination are values that are known from prior analyses to be appropriate values for that given server type and device type combination. For example, if server Type 1 represents Netflix® servers and device Type 1 represents iOS devices, the X, Y and Z values for that entry in the look up table are values known to be appropriate for ABR content provided by Netflix® servers to iOS devices, whereas if device Type 2 represents Android® devices, the X, Y and Z values for the server Type 1 and device Type 2 entry in the look up table are values known to be appropriate for ABR content provided by Netflix® servers to Android® devices.

The intermediate network entity 104 identifies the ABR origin server type (as described above) and the device type (as described above) and provides the server type and device type combination to the monitoring component 112. The monitoring component 112 matches the server type and device type combination with a combination in the look up table 620 and selects the Y value, Z value and X value stored in the look up table 620 for that combination as the first value Y, the second value Z and the third value X to be used to determine the estimate of the play duration in accordance with the expression (1) above.

Having determined the play duration estimate of the ABR media presentation, the monitoring component 112 may select, based at least in part on the determined play duration estimate, one or more control policies to apply to the ABR data flow.

In one example, if the determined play duration estimate is less than a predetermined duration (thereby indicating the media presentation is considered to be of 'short' duration), the monitoring component 112 selects to apply bandwidth throttling to the ABR data flow prior to, immediately as, or shortly after the HTTPs responses $419_1$ to $419_N$ conveying the media presentation segments start to pass through the proxy server 104. Bandwidth throttling involves the proxy server 104 artificially controlling the bandwidth of the connection to the client application 102a over which the HTTPs responses $419_1$ to $419_N$ pass. This controlling of the bandwidth may cause the client application 102a to change the quality variant of the requested media segments so that, for example, if the bandwidth throttling sufficiently reduces the bandwidth, the client application 102a will begin to request media segments of a lower quality variant and, conversely, if the bandwidth throttling sufficiently increases the bandwidth, the client application 102a may begin to request media segments of a higher quality variant (if available). The bandwidth throttling is applied without the monitoring component 112 first analysing any of the HTTPs responses $419_1$ to $419_N$ as they pass through the intermediate network entity 104 in order to determine the particular quality variant of the media segments initially requested by the client application 102a. In the case of short duration media presentations this approach is advantageous because (a) there may not be sufficient time available to perform this analysis before all of the HTTPs responses $419_1$ to $419_N$ conveying the entirety of the media presentation have passed through the intermediate network entity 104 or (b) the time taken to perform the analysis is such that the time remaining before all of the HTTPs responses $419_1$ to $419_N$ conveying the entirety of the media presentation have passed through the intermediate network entity 104 is insufficient for the bandwidth throttling to have a beneficial effect.

In a second example, if the determined play duration estimate is greater than a predetermined duration (thereby indicating the media presentation is considered to be of 'medium' or 'long' duration), the monitoring component 112 selects to first analyse the HTTPs responses $419_1$ to $419_N$ as they pass through the intermediate network entity 104 in order to determine the particular quality variant of the media segments initially requested by the client application 102a and only after the particular quality variant has been determined does the monitoring component 112 apply bandwidth throttling to the ABR data flow. The monitoring component 112 may use the determined quality variant to determine the degree of bandwidth throttling to apply to the ABR data flow. The monitoring component 112 may determine the quality variant and apply the bandwidth throttling using the methods generally described in our application EP16187979.6 the teaching of which is incorporated herein by reference.

In a third example, the monitoring component 112 selects a control policy based on the determined play duration estimate and user data plan information and applies the selected control policy to the ABR data flow. The user data plan information indicates how much data a user of the client device 102 can download over the network 104 in accordance with the user's subscription to the operator of the network 104. The monitoring component 112 may look up the user data plan information in a subscriber database (not shown in the Figures). For example, if the determined play duration estimate is greater than a predetermined amount (i.e. indicating that the media presentation is a large) and the user data plan information indicates that the user has only a small amount of remaining data permitted to be downloaded, the monitoring component 112 immediately starts applying a bandwidth throttle to the ABR data flow to cause the client application 102a to request lower quality segments (and hence consume less data from the data plan). The degree of the bandwidth throttling may depend upon determined play duration estimate and/or the amount of remaining data permitted to be downloaded, for example, the greater the determined play duration estimate and/or the smaller the amount of remaining data permitted to be downloaded, then the greater the degree of bandwidth throttling.

In a fourth example, the monitoring component 112 selects a control policy based on the determined play duration estimate and a value indicating an amount of congestion (e.g. cell congestion) being experienced by the client device 102. The value indicating the amount of congestion may be reported to the intermediate network device 104 by the network 106. For example, if the determined play duration estimate is greater than a predetermined amount (i.e. indicating that the media presentation is a large) and the value indicating an amount of congestion indicates that the amount of congestion is large, the monitoring component 112 immediately starts applying a bandwidth throttle to the ABR data flow to cause the client application 102a to request lower quality segments (and hence consume less data from the data plan). The degree of the bandwidth throttling may depend upon the determined play duration estimate and/or the value indicating an amount of congestion, for example, the greater the determined play duration estimate and/or the greater the value indicating an amount of congestion, then the greater the degree of bandwidth throttling. If the determined play duration estimate is smaller than a predetermined amount (i.e. indicating that the media presentation is small) then the monitoring component 112 may allow the ABR data flow to pass through the intermediate network device 104 without applying any bandwidth throttling to the ABR data flow irrespective of the value indicating the amount of congestion.

Figure 7:
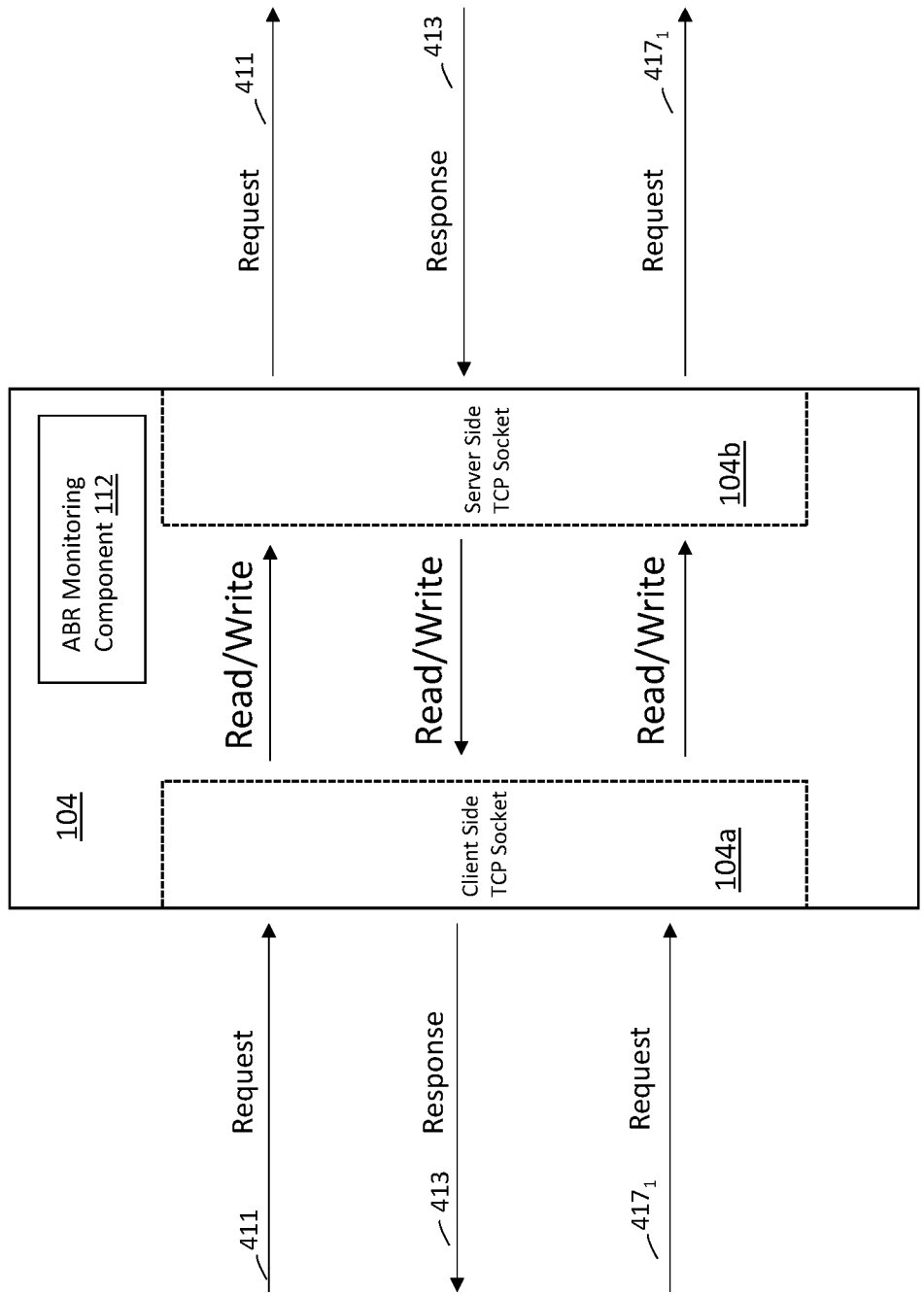
FIG. 7 illustrates one example of a method by which a monitoring component may determine an estimate of a data size of a variant playlist manifest file.

FIG. 7 illustrates one example of a method by which the monitoring component 112 may determine an estimate of the data size of the variant playlist manifest file 450 by monitoring at the Layer 4 level the second HTTPs response 413 that contains the variant playlist manifest file 450.

In this example, the proxy server 104 receives at the client-side TCP socket 104a TCP payload data that makes up the second HTTPs request 411 from the client application 102a (not shown in FIG. 7). It will be appreciated that, in accordance with the TCP/IP protocol stack, this TCP payload data arrives at the proxy server 104 over the first TCP connection 204a (shown in FIG. 2) encapsulated in one or more IP packets. The IP Layer at the proxy server 104 reassembles these one or more IP packets into TCP data (i.e. the IP Layer strips out the IP headers of the one or more IP packets) and presents this TCP data to the TCP layer at the proxy server 104. The TCP layer strips out the TCP headers in this TCP data to provide the TCP payload data.

The proxy server 104 reads this TCP payload data from the client-side socket 104a and writes it to the server-side TCP socket 104b for onwards transmission of data of the second HTTPs request 411 to the origin server 110 (not shown in FIG. 5). Again, it will be appreciated that, in accordance with the TCP/IP protocol stack, the TCP layer at the proxy server 110 will add appropriate TCP headers to the TCP payload data and pass this TCP data to the IP layer at the proxy server 104 which transmits it to the origin server 110 encapsulated in one or more IP packets.

Subsequently, the proxy server 104 receives at the server-side TCP socket 104b TCP payload data that makes up the second HTTPs response 503 that contains the variant playlist manifest file 450. Again, it will be appreciated that, in accordance with the TCP/IP protocol stack, this TCP payload data arrives at the proxy server 104 over the second TCP connection 204b (See FIG. 2) encapsulated in one or more IP packets. The IP Layer at the proxy server 104 reassembles these one or more IP packets into TCP data (i.e. the IP Layer strips out the IP headers of the one or more IP packets) and presents this TCP data to the TCP layer at the proxy server 104. The TCP layer strips out the TCP headers in this TCP data to provide the TCP payload data.

The proxy server 104 reads that data from the server-side TCP socket 104b and writes it to the client side TCP socket 104a for onwards transmission to the client application 102a. Again, it will be appreciated that, in accordance with the TCP/IP protocol stack, the TCP layer at the proxy server 104 will add appropriate TCP headers to the TCP payload data and pass this TCP data to the IP layer at the proxy server 104 which it transmits it to the client application 102a encapsulated in one or more IP packets.

During this process, the monitoring component 112 maintains a running count of the amount data (i.e. the number of Bytes) that is read from the server-side TCP socket 104b and then written to the client-side TCP socket 104b. At some point in time, the proxy server 104 receives at the client-side socket TCP socket 104a TCP payload data that makes up the subsequent HTTPs request $417_1$. The reception of this data at the client side TCP socket 104a indicates to the monitoring component 112 that the data of the second HTTP responses 413 has now fully passed through the proxy server 104 (because a subsequent HTTPs request is not sent by the client application 102a until it receives the previous response) and hence the count of the TCP payload data that makes up the second HTTPs response 413 is now complete. As the second HTTP response 413 contains the variant playlist manifest file 450, the count of the TCP payload data that makes up the second HTTPs response 413 is an approximation of the data size of the variant playlist manifest file 450.

Advantageously, this approach enables the data size of the variant playlist manifest file 450 to be estimated without having to the pass the TCP payload data back up the protocol stack to Layer 7 to reassemble the variant playlist manifest file 450 at the intermediate network entity 104 to parse the playlist manifest file 450 or inspect the HTTPs header (something which is not even possible when the response is encrypted).

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described hereinbefore.

Figure 8:
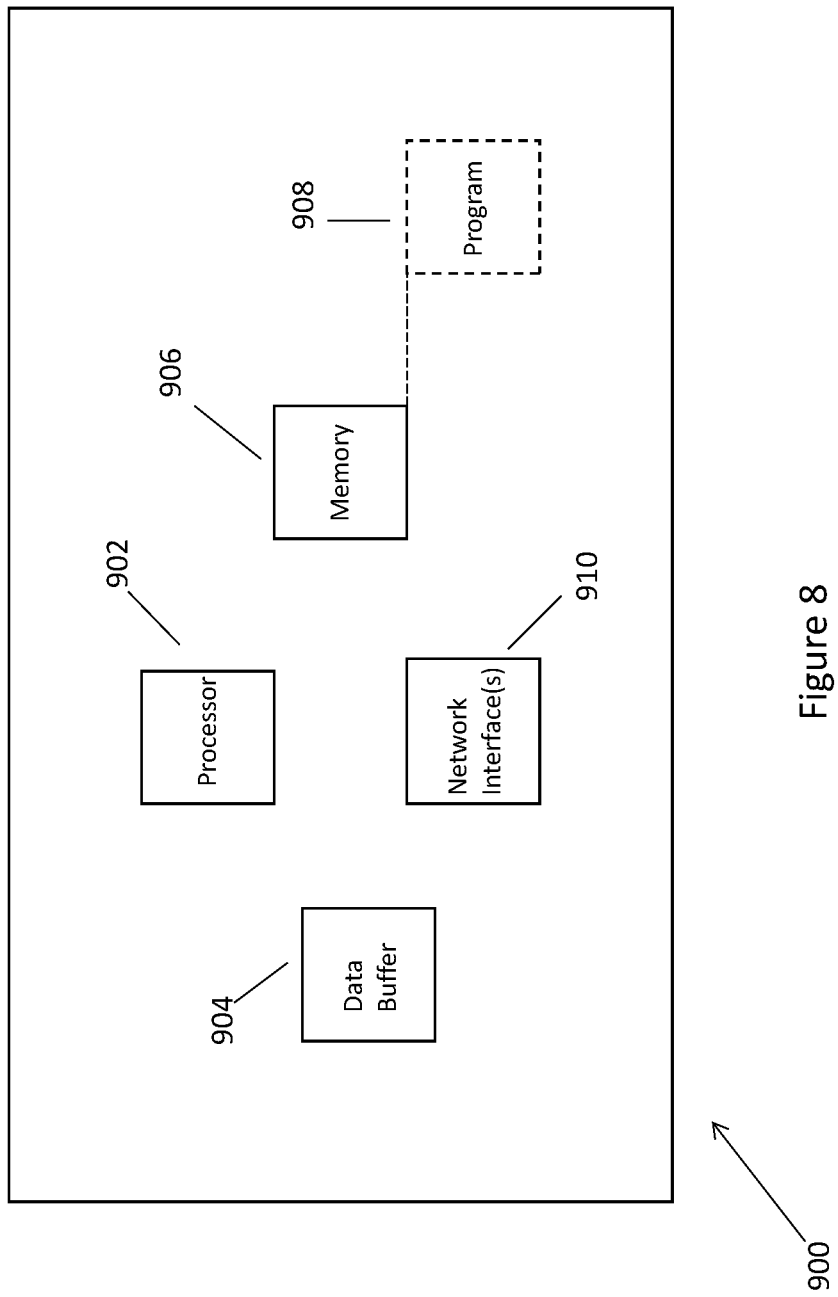
FIG. 8 illustrates a simplified block diagram of a computer system.

Reference is now made to FIG. 8 for illustrating a simplified block diagram of a computer system 900 that is suitable for use in practicing the exemplary embodiments. In particular embodiments, the computer system 900 described in FIG. 8 is configured for communications using the Internet Protocol (IP) suite of standards. In one embodiment, the computer system 900 may be implemented as the proxy server 104.

In an embodiment, the computer system 900 includes processing means such as at least one data processor 902, storing means including a data buffer 904 and at least one computer-readable memory 906 storing computer instruction 908 including an operating system, e.g. Linux. The computer system 900 further includes communicating means such as one or more network interfaces 910 which may be used to receive and send data as described above.

The computer instructions 908 comprises a set of instructions that, when executed by the associated processor 902, enable the computer system 900 to operate in accordance with the exemplary embodiments described above. In these regards the exemplary embodiments may be implemented at least in part by computer software stored on the memory 904, or by hardware, or by a combination of tangibly stored software and hardware (and tangibly stored firmware).

Various embodiments of the computer readable memory 906 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the processor 902 include but are not limited to general purpose computers, special purpose computers, microprocessors, digital signal processors (DSPs) and multi-core processors.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method for determining a play duration estimate of an adaptive bit rate (ABR) media presentation, the method comprising:
   receiving, at a network entity that is located between a client and a server, a media playlist manifest file of an ABR media presentation, wherein the media playlist manifest file is transmitted from the server to the client and comprises a plurality of entries, each entry of the plurality of entries linking to a respective different one of a plurality of media segments of the ABR media presentation;

determining a data size of the media playlist manifest file; and determining a play duration estimate of the ABR media presentation based on the determined data size of the media playlist manifest file, a first value that represents a data size of an individual entry of the plurality of entries in the manifest file and a second value that represents a play duration of an individual media segment of the plurality of media segments of the ABR media presentation.

2. The method of claim 1, the method further comprising:
identifying at least one of a client device type running the client and a server type of the server; and
selecting the first value from a first plurality of values, the selecting being based upon at least one of the client device type and the server type.

3. The method of claim 1, the method further comprising:
identifying at least one of a client device type running the client and a server type of the server; and
selecting the second value from a second plurality of values, the selecting being based upon at least one of the client device type and the server type.

4. The method of claim 1, wherein the step of determining a play duration estimate of the ABR media presentation is further based on a third value that represents a size of data in the media playlist manifest file that is data other than data that defines the plurality of entries.

5. The method of claim 4, the method further comprising:
identifying at least one of a client device type running the client and a server type of the server; and
selecting the third value from a third plurality of values, the selecting being based upon at least one of the client device type and the server type.

6. The method of claim 4, wherein the step of determining the play duration estimate comprises determining the play duration estimate in accordance with the equation:

Play duration estimate=(((determined data size of the manifest file−the third value)/the first value)*the second value).

7. The method of claim 1, the method further comprising:
identifying a server type of the server;
identifying that a message containing the media playlist manifest file is being received at the network entity based on the server type and by monitoring, at Layer 4 or below, a dataflow between the client and the server.

8. The method of claim 1 wherein determining the data size of the media playlist manifest file comprises counting, at Layer 4 or below, a data size of a message that contains the media playlist manifest file when the message passes through the network entity.

9. The method of claim 1 further comprising:
applying a control procedure in respect of a flow of data to the client which flow of data comprises media segments of the ABR media presentation, wherein the control procedure depends at least in part upon the determined play duration estimate.

10. The method of claim 9 wherein, the control procedure comprises controlling a bandwidth of a connection over which the flow of data flows to the client.

11. The method of claim 10, the method further comprising:
in response to determining that the determined play duration estimate meets a first time condition indicative that the play duration is of a short duration, controlling the bandwidth of the connection by reducing the bandwidth of the connection substantially prior to any media segments of the ABR media presentation passing through the network entity.

12. The method of claim 10, the method further comprising:
in response to determining that the determined play duration estimation meets a second time condition indicative that the play duration is of a long duration, controlling the bandwidth of the connection by reducing the bandwidth of the connection and wherein the controlling of the bandwidth is delayed until after media segments of the ABR media presentation have been analysed at the network entity when passing through the network entity to the client.

13. The method of claim 9 wherein the control procedure depends at least in part upon at least one of:
a network congestion level experienced at the client; and
a data quota of a subscription plan associated with a user of the client.

14. An apparatus for determining a play duration estimate of an adaptive bit rate (ABR) media presentation, the apparatus comprising:
at least one processor;
and at least one memory including computer program code;
the at least one memory and the computer program code being configured to with the at least one processor cause the apparatus at least to perform the steps of:
receiving, at a network entity that is located between a client and a server, a media playlist manifest file of an ABR media presentation, wherein the media playlist manifest file is transmitted from the server to the client and comprises a plurality of entries, each entry of the plurality of entries linking to a respective different one of a plurality of media segments of the ABR media presentation;
determining a data size of the media playlist manifest file; and
determining a play duration estimate of the ABR media presentation based on the determined data size of the media playlist manifest file, a first value that represents a data size of an individual entry of the plurality of entries in the manifest file and a second value that represents a play duration of an individual media segment of the plurality of media segments of the ABR media presentation.

15. A non-transitory computer programme readable storage medium comprising a set of computer readable instructions, which, when executed by a processing system causes the system to implement a method for determining a play duration estimate of an adaptive bit rate (ABR) media presentation, the method comprising:
receiving, at a network entity that is located between a client and a server, a media playlist manifest file of an ABR media presentation, wherein the media playlist manifest file is transmitted from the server to the client and comprises a plurality of entries, each entry of the plurality of entries linking to a respective different one of a plurality of media segments of the ABR media presentation;

determining a data size of the media playlist manifest file; and determining a play duration estimate of the ABR media presentation based on the determined data size of the media playlist manifest file, a first value that represents a data size of an individual entry of the plurality of entries in the manifest file and a second value that represents a play duration of an individual media segment of the plurality of media segments of the ABR media presentation.

\* \* \* \* \*